United States Patent
Singhal et al.

(10) Patent No.: US 12,412,029 B2
(45) Date of Patent: Sep. 9, 2025

(54) SHARING DESIGN DOCUMENTS EFFICIENTLY ACROSS COMPUTER NETWORKS THROUGH SIZE AGNOSTIC MOMENT IN TIME REVIEW ARTIFACTS

(71) Applicant: Adobe Inc., San Jose, CA (US)

(72) Inventors: Gagan Singhal, Shakur Basti (IN); Ankur Krishna Gautam, Noida (IN); Deepak Kumar Sharma, Chhoti Sadri (IN)

(73) Assignee: Adobe Inc., San Jose, CA (US)

( * ) Notice: Subject to any disclaimer, the term of this patent is extended or adjusted under 35 U.S.C. 154(b) by 237 days.

(21) Appl. No.: 18/328,103

(22) Filed: Jun. 2, 2023

(65) Prior Publication Data
US 2024/0403550 A1    Dec. 5, 2024

(51) Int. Cl.
*G06F 17/00*   (2019.01)
*G06F 40/12*   (2020.01)
*G06F 40/197*  (2020.01)

(52) U.S. Cl.
CPC ............ *G06F 40/197* (2020.01); *G06F 40/12* (2020.01)

(58) Field of Classification Search
CPC .... G06F 40/197; G06F 40/12; G06F 12/0261; G06F 9/451; G06F 3/0481; G06F 3/04883; G06Q 30/06; G06Q 30/0641
USPC ......................................................... 715/229
See application file for complete search history.

(56) References Cited

U.S. PATENT DOCUMENTS

| | | | |
|---|---|---|---|
| 2006/0044599 A1* | 3/2006 | Lipowitz | G06Q 30/06 358/1.15 |
| 2008/0235262 A1* | 9/2008 | Holm | G06Q 10/10 707/999.102 |
| 2014/0248001 A1* | 9/2014 | Leask | G06F 21/1063 382/299 |
| 2016/0196054 A1* | 7/2016 | Perez-Feliciano | G06F 9/451 715/829 |
| 2017/0139824 A1* | 5/2017 | Dragoljevic | G06F 12/0261 |
| 2017/0345459 A1* | 11/2017 | Manville | H04N 21/2402 |

* cited by examiner

*Primary Examiner* — Jason T Edwards
(74) *Attorney, Agent, or Firm* — Keller Preece PLLC

(57) ABSTRACT

The present disclosure is directed toward systems, methods, and non-transitory computer readable media that share digital design documents efficiently across computer networks through size agnostic moment in time review artifacts. In particular, the disclosed systems utilize multifurcated digital repositories to provide a streamlined approach to generating size-agnostic links for sharing digital design documents across client devices. The disclosed systems can generate a link to a multifurcated digital repository which displays a low-resolution rendition of the current version of a document on the client device while updating the multifurcated digital repository with a full-resolution rendition of the document.

20 Claims, 12 Drawing Sheets

SHARING DESIGN DOCUMENTS EFFICIENTLY ACROSS COMPUTER NETWORKS THROUGH SIZE AGNOSTIC MOMENT IN TIME REVIEW ARTIFACTS

BACKGROUND

Advancements in computing devices and networking technology have given rise to a variety of innovations in sharing and storing digital documents. For example, it is common for client devices to access shared digital documents and synchronize changes to shared digital document content across diverse physical locations and over a variety of computing devices. Unfortunately, it can be difficult for client devices to coordinate the efficient review of changes to collaborative design content that include raster and vector content. As a complication, it is challenging for client devices to coordinate and differentiate between changes made within shared design documents at different times or within different versions. Another complication is coordinating the sharing of multiple versions of design documents efficiently between user accounts. Accordingly, the state of the art has a number of shortcomings with regard to flexibility and efficiency when providing and reviewing collaborative design documents.

SUMMARY

One or more embodiments provide benefits and/or solve one or more of the foregoing or other problems in the art with systems, methods, and non-transitory computer readable storage media that share design documents efficiently across computer networks through size agnostic moment in time review artifacts. In particular, the disclosed systems utilize moment in time versions of graphical content to provide a streamlined size agnostic link generation system. For example, in some embodiments, the disclosed systems generate a multifurcated digital repository containing a low-resolution rendition of the current version of a digital design document. After receiving a link request from the client device for sharing the digital design document, the disclosed systems provide a link to the multifurcated digital repository thereby providing quick (e.g., instant) access to the low-resolution rendition of the current version of the digital design document on the client device. Moreover, the disclosed systems update the multifurcated digital repository with a full resolution version of the digital design document. Upon updating the multifurcated digital repository, the disclosed systems replace the low-resolution version of the multifurcated digital repository with the full resolution version of the multifurcated digital repository.

BRIEF DESCRIPTION OF THE DRAWINGS

This disclosure will describe one or more example implementations of the systems and methods with additional specificity and detail by referencing the accompanying figures. The following paragraphs briefly describe those figures, in which.

DETAILED DESCRIPTION

Figure 1:
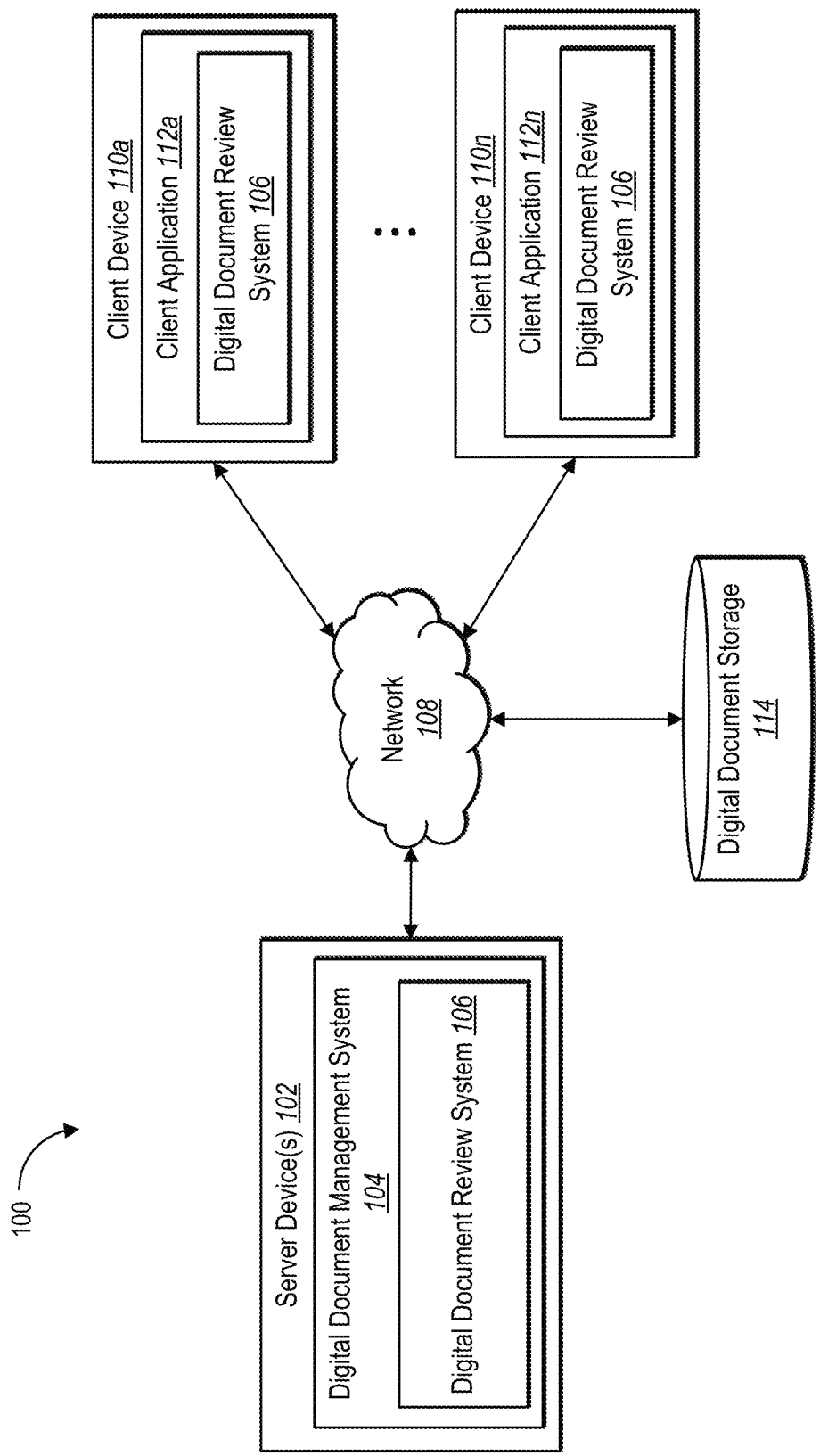
FIG. 1 illustrates a schematic diagram of an example environment of a digital document review system in accordance with one or more embodiments.

This disclosure describes one or more embodiments of a digital document review system that shares design documents efficiently across computer networks through size agnostic moment in time review artifacts. In particular, in one or more implementations, the digital document review system facilitates the review of digital design documents by efficiently providing moment-in-time renditions of digital design documents within a collaborative space. For example, in one or more embodiments, the digital document review system utilizes a native cloud document format and introduces a multifurcated document (e.g., a zero document) to facilitate size agnostic instant link generation. In particular, the digital document review system utilizes a low-resolution, minimalistic version that includes a specific resolution rendition of the original asset to initiate artifact review. In one or more implementations, the digital document review system incrementally reproduces data from the original document to the multifurcated/zero document repository. The digital document review system can use the low-resolution rendition to render initially and then switch to the native rendition of the artifact once uploaded to the multifurcated document repository.

As discussed above, conventional systems have a number of technical shortcomings with regard to operational flexibility and computational efficiency. Many conventional systems lack the flexibility to provide moment-in-time renditions of digital documents for collaboration, modification, and document review. Instead, most existing conventional systems share the original document to gather feedback and review forcing the user to manually create a separate copy of the original document.

Additionally, conventional systems are often computationally inefficient. For example, conventional systems are time intensive, with complicated/large digital design documents taking upwards of 30-40 seconds to generate a link. To illustrate, some conventional systems create an online rendition of a digital design document, create a configurable and sharable link, and then share the link with a client device. Indeed, conventional systems generate full-resolution versions (e.g., in a PDF format) of digital design documents before generating a shareable link for client device collaboration. By uploading full-rendition versions before providing renditions of digital design document conventional systems are highly inefficient.

As suggested above, embodiments of the digital document review system can provide a variety of advantages over conventional document review systems. For instance, the digital document review system can improve operational flexibility. For example, the digital document review system provides a flexible option for providing shareable links to moment-in-time renditions of digital design documents that are independent of the size of the digital design document. In particular, by utilizing a multifurcated digital repository format, the digital document review system can create shareable links to moment-in-time renditions quickly (e.g., instantly) and independent of the digital design document size or location (e.g., local/remote filesystem). Indeed, the digital document review system allows client devices to begin review of the digital design document immediately (using a low-resolution rendition) while the full-resolution version of the digital design document is uploaded to the multifurcated document.

Relatedly, the digital document review system provides an efficient method for document review and sharing across computer networks. Unlike conventional systems, the digital document review system can provide an instant link for the client device to share with additional client devices for reviewing the digital design document. By utilizing a multifurcated digital repository, the digital document review system can quickly generate links in a manner that is independent of the size or location of the source document. Additionally, unlike conventional systems that provide links in an irregular amount of time dependent upon the size of the source document, the digital document review system can provide consistency across applications by providing shareable links in a stable time frame independent of source document size or location.

Furthermore, the digital document review system provides improved computing efficiency in connection with generating and sharing moment-in-time renditions of digital design documents. In particular, in contrast to conventional document presentation systems that require the user to manually create a separate copy of the original document to achieve the functionality of an autonomous moment-in-time review, the digital document review system utilizes multifurcated documents to provide fast (e.g., near-instant) access to moment-in-time renditions of digital design document. Thus, the digital document review system can provide a streamlined size agnostic link generation approach for reviewing digital documents. Specifically, the digital document review system dynamically modifies a multifurcated digital repository to include up-to-date document content reflecting the current rendition of the digital design document. Accordingly, the document expansion system reduces computational resources required when the client device requests a link to the moment-in-time renditions of digital design document by providing a link to the previously created multifurcated digital repository to the client device.

For example, in some embodiments, the digital document review system generates a link to a multifurcated digital repository which displays a low-resolution rendition of the current version of a digital design document for display on the client device while the full-resolution rendition is updating/uploading within the multifurcated digital repository. Once the full-resolution rendition of the digital design document is updated, the disclosed systems can switch to displaying the full-resolution rendition within the multifurcated digital repository. In this way, the client device can provide a link to display the digital design document on the client device in a timely manner that is independent of the digital design document size. Indeed, in some implementations, the digital document review system improves speed gains in generating a link by 300-800% relative to conventional systems.

In one or more embodiments, the digital document review system can display different versions of the digital design document. For example, the digital document review system can map the current version of the digital design document to a predefined resolution in the first portion of the multifurcated digital repository, utilizing a predefined resolution that is lower than an initial resolution of the current version of the digital design document. Additionally, the digital document review system can map the current version of the digital design document at the initial resolution (full resolution) to a second portion of the multifurcated digital repository.

As also mentioned, the digital document review system can provide to an additional client device, based on the additional client device utilizing the digital link, a low-resolution rendition of the current version of the digital design document. As mentioned, the digital document review system can display a first portion of the multifurcated digital repository that contains the low-resolution rendition of the current version of a digital design document while the full-resolution rendition is updating within a second portion the multifurcated digital repository. Once the digital document review system detects that the full-resolution rendition of the digital design document is updated within the multifurcated digital repository, the digital document review system can switch to displaying the full-resolution rendition within the multifurcated digital repository.

In a similar fashion, the digital document review system can update the multifurcated digital repository based on receiving a link request from the client device. For example, the digital document review system can create the multifurcated digital repository with a low-resolution rendition of the current version of the digital design document. Further, the digital document review system can update the multifurcated digital repository with updated low-resolution renditions as the current version of the digital design document changes. And, when the digital document review system receives a request to generate a link request to generate a shareable link to a current version of the digital design document, the digital document review system can update the multifurcated digital repository with a high-resolution rendition of the current version of the digital design document.

Similarly, the digital document review system can update the multifurcated digital repository based on receiving a request to update the multifurcated digital repository with an updated version of the digital design document. For example, based on a request from the client device, the digital document review system can update the existing multifurcated digital repository to reflect an update to the digital design document. In particular, the digital document review system can update the multifurcated digital repository to contain a low-resolution rendition of the updated digital design document in the first portion of the multifurcated digital repository for display on an additional client device. Furthermore, the digital document review system can update the second portion of the multifurcated digital repository to contain a high-resolution rendition of the updated digital design document in the second portion of the multifurcated digital repository. When the digital document review system completes the upload of the second portion of the multifurcated digital repository with the high-resolution rendition of the updated digital design document, the digital document review system can provide the high-resolution rendition for display on the additional client device.

Furthermore, the digital document review system can update the multifurcated digital repository based on the predicted use of the multifurcated digital repository. For example, the digital document review system can determine that a link request was not received from the client device when accessing the digital design document. For example, if the digital document review system determines that the client device closes the digital design document without requesting a shareable link to a current version of the digital design document, the digital document review system can delete the multifurcated digital repository and free up system resources.

Additional detail regarding the digital document review system will now be provided with reference to the figures. For example, FIG. 1 illustrates a schematic diagram of an exemplary system environment ("environment") 100 in which a digital document review system 106 operates. As illustrated in FIG. 1, the environment 100 includes server device(s) 102, a network 108, client devices 110a-110n, and a digital document storage 114.

Although the environment 100 of FIG. 1 is depicted as having a particular number of components, the environment 100 is capable of having any number of additional or alternative components (e.g., any number of servers, client devices, or other components in communication with the digital document review system 106 via the network 108). Similarly, although FIG. 1 illustrates a particular arrangement of the server device(s) 102, the network 108, and the client devices 110a-110n, various additional arrangements are possible.

The server device(s) 102, the network 108, and the client devices 110a-110n are communicatively coupled with each other either directly or indirectly (e.g., through the network 108 discussed in greater detail below in relation to FIG. 9). Moreover, the server device(s) 102 and the client devices 110a-110n include one of a variety of computing devices (including one or more computing devices as discussed in greater detail with relation to FIG. 9).

As illustrated in FIG. 1, the environment 100 includes the server device(s) 102. The server device(s) 102 generates, tracks, stores, processes, receives, and transmits electronic data, including digital design documents and multifurcated digital repositories. The server device(s) 102 can further access and utilize the digital document storage 114 to store and retrieve information such as digital design documents and/or multifurcated digital repositories. The digital document storage 114 can be a local or remote storage for digital documents.

For example, the server device(s) 102 receives or monitors interactions across the client devices 110a-110n. In some implementations, the server device(s) 102 transmit content to the client devices 110a-110n to cause the client devices 110a-110n to display content associated with digital design documents. For example, the server device(s) 102 can present a rendition of a digital design document to the client devices 110a-110n.

Additionally, the server device(s) 102 includes all, or a portion of, the digital document review system 106. For example, the digital document review system 106 operates on the server device(s) 102 to access informational digital documents, determine content changes, and provide localization of content changes to the client devices 110a-110n. In one or more embodiments, via the server device(s) 102, the digital document review system 106 generates and displays renditions of digital documents based on sections of content within multifurcated digital repositories. Example components of the digital document review system 106 will be described below with regard to FIG. 8.

Furthermore, as shown in FIG. 1, the system environment includes the client devices 110a-110n. In some embodiments, the client devices 110a-110n include, but are not limited to, mobile devices (e.g., smartphones, tablets), laptop computers, desktop computers, or other type of computing devices, including those explained below in reference to FIG. 10. Some embodiments of client devices 110a-110n are operated by a user to perform a variety of functions via respective client applications 112a-112n. The client devices 110a-110n include one or more applications (e.g., the client applications 112a-112n) that can access, edit, modify, store, and/or provide, for display, informational digital documents. For example, in some embodiments, the client applications 112a-112n include a software application installed on the client devices 110a-110n. In other cases, however, the client applications 112a-112n include a web browser or other application that accesses a software application hosted on the server device(s) 102.

The digital document review system 106 can be implemented in whole, or in part, by the individual elements of the environment 100. Indeed, as shown in FIG. 1 the digital document review system 106 can be implemented with regard to the server device(s) 102 and/or at the client devices 110a-110n. In particular embodiments, the digital document review system 106 on the client devices 110a-110n comprises a web application, a native application installed on the client devices 110a-110n (e.g., a mobile application, a desktop application, a plug-in application, etc.), or a cloud-based application where part of the functionality is performed by the server device(s) 102.

In additional or alternative embodiments, the digital document review system 106 on the client devices 110a-110n represents and/or provides the same or similar functionality as described herein in connection with the digital document review system 106 on the server device(s) 102. In some implementations, the digital document review system 106 on the server device(s) 102 supports the digital document review system 106 on the client devices 110a-110n.

In some embodiments, the digital document review system 106 includes a web hosting application that allows the client devices 110a-110n to interact with content and services hosted on the server device(s) 102. To illustrate, in one or more implementations, the client devices 110a-110n accesses a web page or computing application supported by the server device(s) 102. The client devices 110a-110n provides input to the server device(s) 102 (e.g., selected content items). In response, the digital document review system 106 on the server device(s) 102 generates a multifurcated digital repository. The server device(s) 102 then provides the multifurcated digital repository to the client devices 110a-110n.

In some embodiments, though not illustrated in FIG. 1, the environment 100 has a different arrangement of components and/or has a different number or set of components altogether. For example, in certain embodiments, the client devices 110a-110n communicate directly with the server device(s) 102, bypassing the network 108. As another example, the environment 100 includes a third-party server comprising a content server and/or a data collection server.

As previously mentioned, in one or more embodiments, the digital document review system 106 generates and shares moment-in-time renditions of digital design content through use of multifurcated digital repositories. For instance, FIG. 2 illustrates an overview diagram of the digital document review system 106 generating and sharing a multifurcated digital repository containing renditions of a digital design document in accordance with one or more embodiments.

Figure 2:
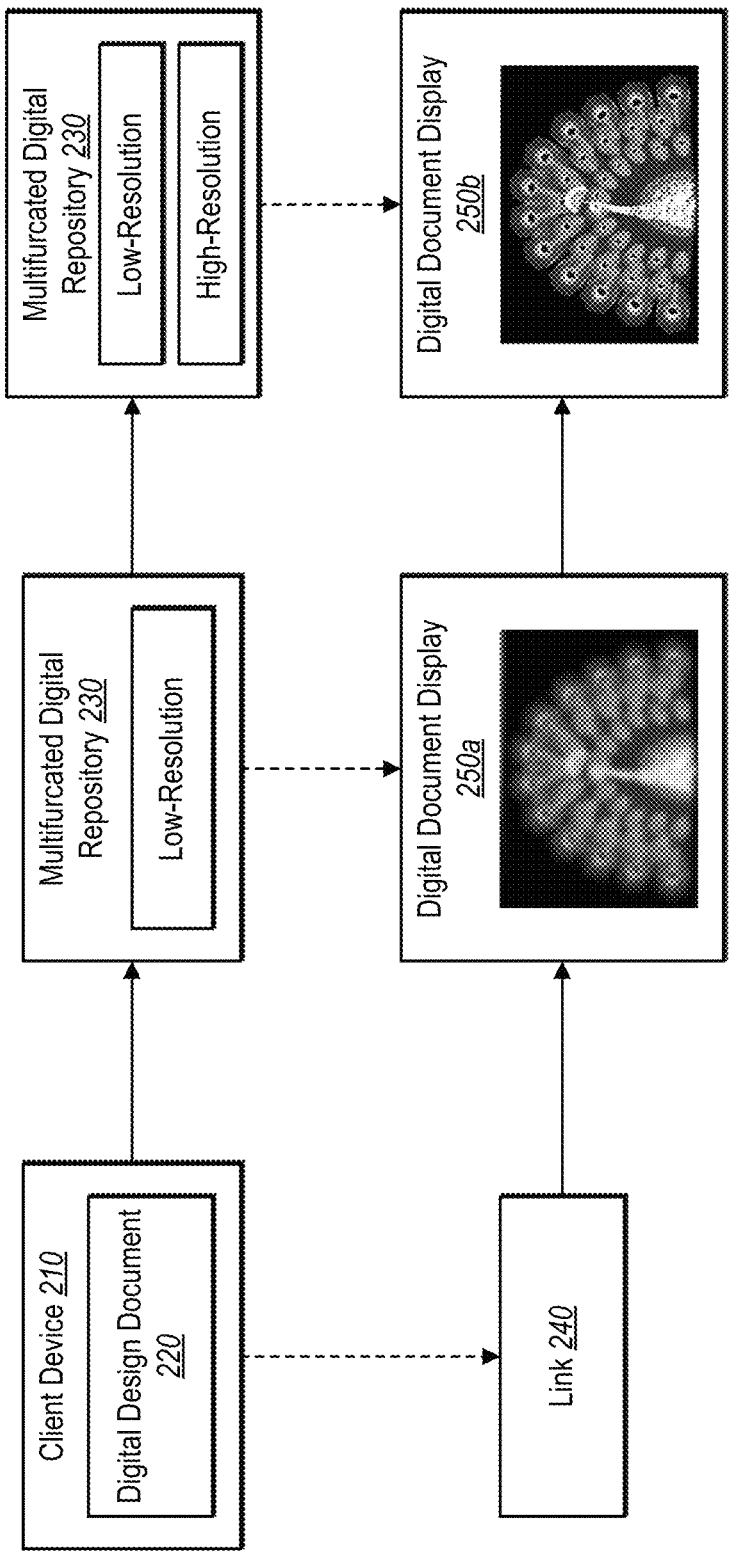
FIG. 2 illustrates an example overview of generating and providing a digital design document to an additional client device in accordance with one or more embodiments.

As shown in FIG. 2, the digital document review system 106 receives a digital design document 220 from a client device 210. For example, a digital design document includes a visual representation of an object, scene, or subject that has been captured or created in a digital format. To illustrate, the digital design document 220 can incorporate raster and/or vector content. In particular, the digital design document 220 can include a representation of visual information that can be displayed, stored, and manipulated electronically using digital devices and applications such as computers, cameras, smartphones, and digital editing software. The digital design document 220 can be stored on a local or remote filesystem. The digital design document 220 can be stored in various file formats, such as PSD, AI, JPEG, PNG, GIF, TIFF, or RAW, which determine how the image data is compressed, encoded, and stored. For example, a digital design document 220 can include an ADOBE® PHOTOSHOP or an ADOBE® ILLUSTRATOR document.

In particular, in one or more embodiments, the digital design document 220 contains a current version of a digital design document. As mentioned, the digital document review system utilizes different versions of digital design documents. For example, the current version of the digital design document 220 refers to the properties and/or content of a digital design document 220 at a particular time (e.g., a current or most-recent time period). In particular, the current version of the digital design document 220 refers to a snapshot comprising the current properties and content of the digital design document 220. For example, a version of a digital design document that includes all of the most recent modifications and features of the digital design document 220 is an example of the current version of the digital design document 220.

As further shown in FIG. 2, the digital document review system 106 creates a multifurcated digital repository 230. In particular, the multifurcated digital repository 230 includes a type of digital document or file that contains multiple sections or subsections, forming a divided structure or architecture. For instance, the multifurcated digital repository 230 is organized with multiple interconnected sections or subsections that can be displayed in different sequences or combinations, providing a flexible and dynamic way of presenting information or content. Indeed, the digital document review system can utilize the sections of the multifurcated digital repository 230 to store a distinct version of content, enabling the system to display the content of each section according to client device need.

Relatedly, a multifurcated digital repository 230 includes a multifurcated digital document. A multifurcated digital document includes a digital document that incorporates multiple or separate sections, each section containing distinct content or image renditions. For example, in contrast to a linear document that includes a single rendition of an image, a multifuracated digital document contains multiple renditions of the image. In particular, a multifurcated digital document allocates separate renditions of the digital image within separate sections of the multifurcated digital document. By utilizing a multifurcated digital document, the digital document review system 106 displays a specific rendition of a digital image based on client device need.

For example, the multifurcated digital repository 230 can be a bifurcated digital document with two sections (a first and second section) that contain a low-resolution digital image (in the first section) and a high-resolution digital image (in the second section). As another example, the multifurcated digital repository 230 can be a trifurcated digital document with three sections. To illustrate, in some implementations, the digital document review system utilizes a DCX format. The multifurcated digital repository 230 can store information in other formats. To illustrate, in some implementations, the digital document review system utilizes a DCX file to store a native cloud document format, such as .aic or .psdc.

As shown, the digital document review system 106 initially creates the multifurcated digital repository 230 with one section allocated to the low-resolution rendition (e.g., a minimal sized rendition) of the digital design document 220. In particular, a low-resolution rendition includes a document or image comprising a lower resolution (e.g., less detail, fewer pixels, lower clarity, etc.) compared to another document or image. For instance, a low-resolution rendition can include a compressed, lower resolution version of the digital design document 220. As an example, the low-resolution rendition can be a 512×512 resolution rendition of the digital design document 220. Notably, the low-resolution rendition can be minimally sized rendition of the digital design document 220 that is a smaller or larger than 512×512.

In one or more embodiments, the digital design document 220 is located in storage space accessible to the client device, such as a local filesystem on the client device. Notably, the digital document review system 106 creates the multifurcated digital repository 230 on a collaborative digital document storage that is accessible through a collaborative web interface. In this way, the digital document review system 106 creates the multifurcated digital repository 230 in a location that will facilitate quicker access for additional client devices. To illustrate, the digital document review system 106 can immediately provide access to the multifurcated digital repository 230 to additional client devices as soon as the multifurcated digital repository 230 is created as described in more detail below.

As shown, the digital document review system 106 updates the multifurcated digital repository 230 with a high-resolution digital rendition of the digital design document 220. A high-resolution rendition includes a document or image comprising a higher resolution (e.g., additional detail, pixels, clarity, etc.) relative to another document or image. For example, a high-resolution rendition can include a full resolution rendition, or initial rendition, of a digital design document 220. The multifurcated digital repository 230 is updated by incrementally copying the full resolution rendition of the digital design document 220 within the second section of the multifurcated digital repository 230 to create the high-resolution digital rendition of the digital design document 220. To illustrate, in FIG. 2 the multifurcated digital repository 230 (after updating) is a bifurcated digital document with two sections (a first and second section) that contain a low-resolution digital rendition of the digital design document 220 (in the first section) and a high-resolution digital rendition, full fidelity version, of the digital design document 220 (in the second section).

As mentioned, the digital document review system 106 can create a multifurcated digital repository 230 with multiple sections, not limited to a certain number, with multiple resolution renditions of the digital design document 220

(e.g., trifurcated, tetra-furcated, and/or penta-furcated). For example, the digital document review system 106 can create a trifurcated digital document 230 which includes a mid-resolution rendition of the digital design document 220 in a third section. In this way, the digital document review system 106 can update the multifurcated digital repository 230 incrementally with multiple resolutions. To illustrate, the digital document review system 106 can update the multifurcated digital repository 230 with a low-resolution rendition of the digital design document 220 and provide the low-resolution rendition for display on an additional client device, the digital document review system 106 can then update the multifurcated digital repository 230 with a mid-resolution rendition of the digital design document 220 and provide the mid-resolution rendition for display on the additional client device, the digital document review system 106 can then update the multifurcated digital repository 230 with a high-resolution rendition (e.g., full fidelity version) of the digital design document 220 and provide the high-resolution rendition for display on the additional client device. In this manner, the digital document review system 106 can provide the digital design document 220 for review utilizing multiple lower resolution renditions on additional client devices while mapping (or saving/uploading) the full resolution version in the multifurcated digital repository 230.

As further illustrated in FIG. 2, the digital document review system 106 provides a digital link 240 to the client device that is shareable with additional client devices. For example, the digital link 240 includes a link to a reference, pointer, URL, or hyperlink to digital content. For instance, the digital link 240 includes a pointer to a digital resource (e.g., a digital resource hosted at a remote computing device). The digital link 240 can be a clickable or interactive element that connects one digital resource, such as a website, web page, document, image, video, or other online content, to another digital resource, either within the same website or on a different website or online platform.

For example, a digital link 240 can provide a connection to access a rendition of the digital design document 220. To illustrate, the digital link 240 can be a clickable or interactive element that connects (e.g., within the same website or on a different website or online platform) to the multifurcated digital repository 230. The digital link 240 provides a connection/link to access the available renditions of the digital design document 220 within the multifurcated digital repository 230. For example, as shown, the client device can access the digital document display 250a via the digital link 240 to view the low-resolution rendition of the digital design document 220 within the multifurcated digital repository 230. Furthermore, the client device can access the digital document display 250b to display the high-resolution rendition (e.g., full fidelity version) of the digital design document 220 by displaying the multifurcated digital repository 230 utilizing the digital link 240 (by replacing the display of the low-resolution rendition with the high-resolution rendition when the high-resolution rendition, full fidelity version, is requested/available). In particular, the digital document review system 106 can provide one or more of the available renditions of the digital design document 220 by using the same digital link 240.

To illustrate, the digital document review system 106 can update the multifurcated digital repository 230 to contain the low-resolution rendition of the digital design document 220. The client device can display the digital document display 250a by displaying the content of the multifurcated digital repository 230 that corresponds to the low-resolution rendition of the digital design document 220. Moreover, the digital document review system 106 can update the multifurcated digital repository 230 to include the high-resolution rendition of the digital design document 220. In one or more embodiments, the client device can display the digital document display 250b by displaying the content of the multifurcated digital repository 230 that corresponds to the high-resolution rendition of the digital design document 220. To illustrate, the digital document review system 106 can provide an indication to the client device that the high-resolution rendition (e.g., full fidelity version) of the digital design document 220 has been fully uploaded within the multifurcated digital repository 230 and the client device can display the digital document display 250b by displaying the content of the multifurcated digital repository 230 that corresponds to the high-resolution rendition of the digital design document 220.

Figure 3:
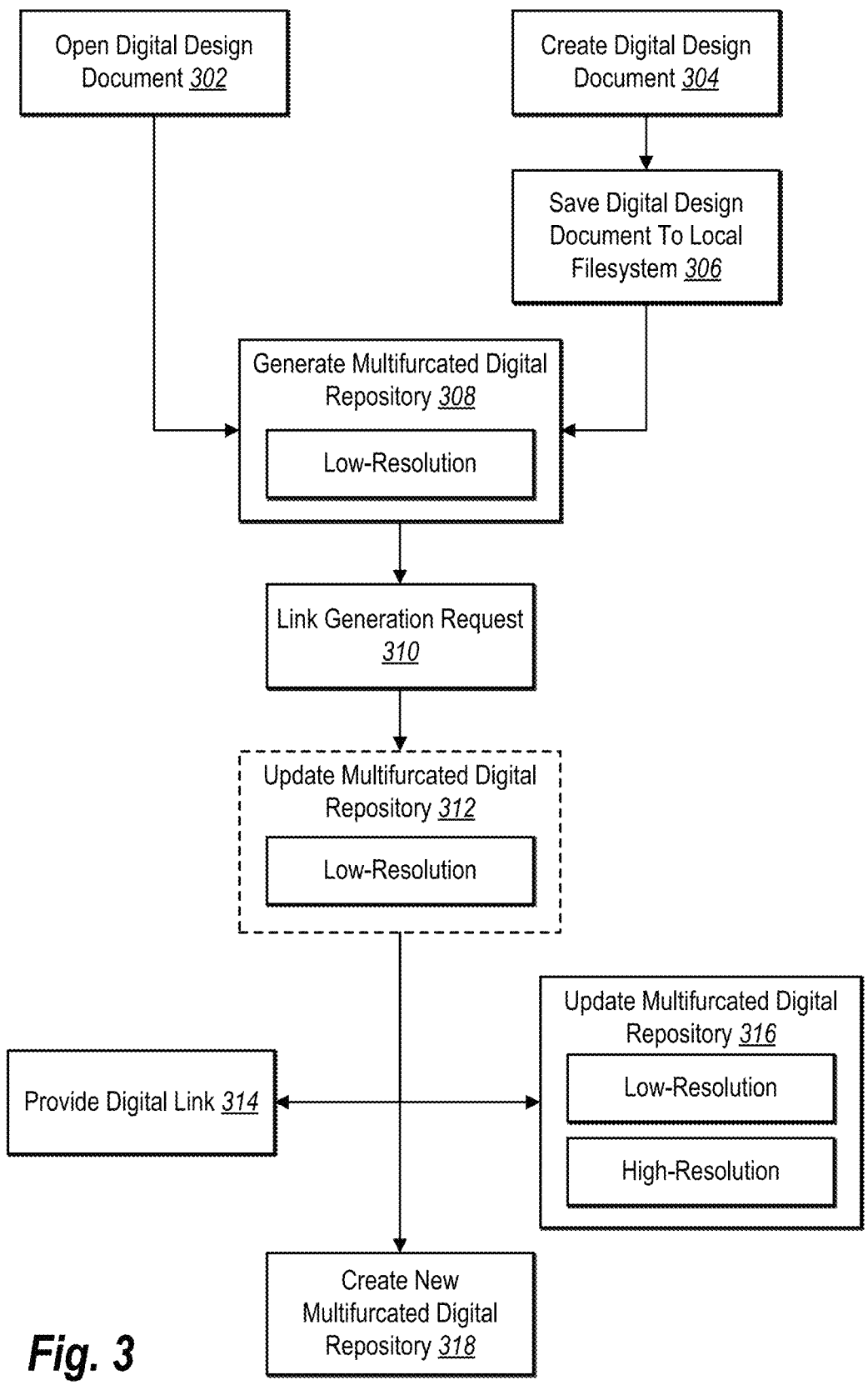
FIG. 3 illustrates an example flow of providing a link to review a digital design document in accordance with one or more embodiments.

As mentioned above, the digital document review system 106 can dynamically generate and access digital design content. FIG. 3 illustrates an overview of generating and providing a digital design document to a client device in accordance with one or more embodiments.

When the client device opens or creates a digital design document for the first time, the digital document review system 106 creates a multifurcated digital repository and subsequently utilizes that multifurcated digital repository to provide access to additional client devices for review. The digital document review system 106 also periodically updates the rendition of the multifurcated digital repository when new changes are saved in the original digital design document. When a client device requests the creation of a digital link to a current rendition of the digital design document, the digital document review system 106 provides a digital link to the already created multifurcated digital repository. Once the digital link is made available to the user of the client device, the digital document review system 106 updates the multifurcated digital repository with the full original content in the background. Furthermore, the digital document review system 106 initiates the creation of a new multifurcated digital repository for subsequent digital link requests.

To illustrate, the digital document review system 106 performs an act 302 to open a digital design document. In particular, the digital document review system 106 opens a digital document that contains a current version of a digital design document accessible by a first client device. Alternatively, the digital document review system 106 performs an act 304 to create a digital design document. In particular, the digital document review system 106 creates a digital design document that contains a current version of a digital design document accessible by a first client device. Additionally, the digital document review system 106 performs the act 306 to save the digital design document to the local file system. Notably, the digital document review system 106 can also perform the act 306 to save the digital design document to a local or remote digital document storage.

As further shown in FIG. 3, the digital document review system 106 generates a multifurcated digital repository. As shown, the digital document review system 106 performs the act 308 to create the multifurcated digital repository with one section allocated to the low-resolution rendition (e.g., a minimal sized rendition) of the digital design document. For example, the digital document review system 106 can map the current version of the digital design document to a predefined resolution that is lower than the initial resolution (e.g., a low-resolution rendition) of the digital design document. The digital document review system 106 can save the low-resolution rendition of the digital design document to a first portion of the multifurcated digital repository.

Additionally, the digital document review system 106 can perform the act 310 to receive a link generation request from a client device. For example, a link request refers to a request to provide a digital link to digital content. To illustrate, a link request can include a request to provide a digital link to a current version of a digital design document. In particular, the digital document review system 106 can perform the act 310 to receive a link generation request made by the system to provide a digital link to a current version of the digital design document.

As further shown, the digital document review system 106 can, optionally, perform the act 312 to update the multifurcated digital repository. In particular, the digital document review system 106 can perform the act 312 to update the multifurcated digital repository if the current version of the digital design document has been modified since the creation of the multifurcated digital repository. For example, if the client device performs the act 308 to generate a multifurcated digital repository, and subsequently updates the digital design document, the multifurcated digital repository may not represent the most recent changes to the digital design document. Thus, the digital document review system 106 may perform the act 312 to update the multifurcated digital repository to reflect a low-resolution rendition of the most recent version (e.g., current moment-in-time rendition) of the digital design document. Alternatively, the digital document review system 106 may skip the act 312 and not update the multifurcated digital repository if the multifurcated digital repository is up-to-date. Additionally, if the client device has not saved the changes to the digital design document, the digital document review system 106 may skip the act 312 and maintain the most recent saved modifications to the digital design document within the multifurcated digital repository (and not include the unsaved changes in the multifurcated digital repository).

Further, the digital document review system 106 performs the act 314 to provide the digital link to the multifurcated digital repository to the client device. As shown, the digital document review system 106 provides the digital link in a streamlined manner by providing the digital link to the multifurcated digital repository either immediately after the act 310 of receiving a link generation request or immediately upon completing the act 312 of updating the multifurcated digital repository and before uploading the high-resolution rendition to the multifurcated digital repository. For example, the digital document review system 106 can provide a digital link that can be used to view the multifurcated digital repository through a collaborative web interface on a client device.

As also shown, the digital document review system 106 performs the act 316 to update the multifurcated digital repository with the high-resolution version of the digital design document. For example, the digital document review system 106 updates the multifurcated digital repository to include the high-resolution rendition of the current version of the digital design document in a second portion of the multifurcated digital repository by mapping the current version of the digital design document to the second portion of the multifurcated digital repository at the initial resolution of the digital design document.

Additionally, the digital document review system 106 performs the act 318 to create a new multifurcated digital repository for subsequent link generation requests. In particular, the digital document review system 106 can generate a new multifurcated digital repository immediately upon performing act 310 (or after optional act 312) to generate a link to the current version of the digital design document. In this way, the digital document review system 106 can also streamline the creation of subsequent digital links to subsequent versions of the digital design document.

Figure 4:
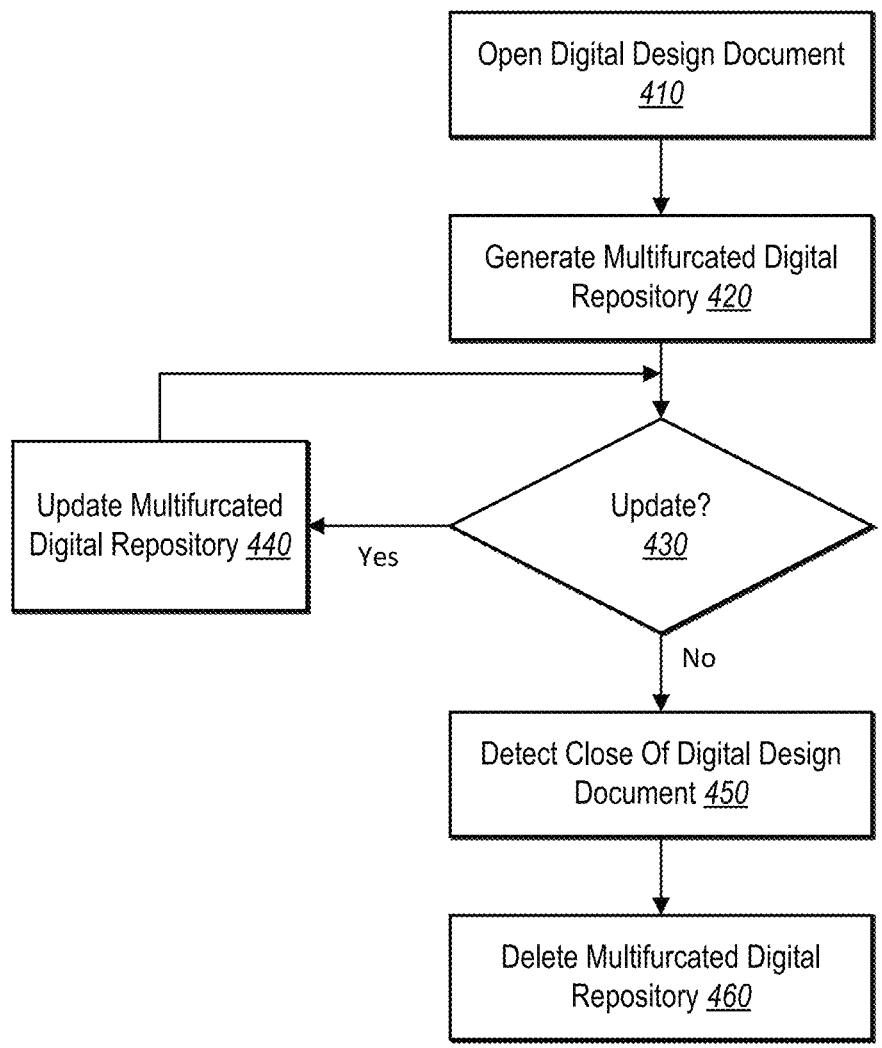
FIG. 4 illustrates an example flow of updating a multifurcated digital repository in accordance with one or more embodiments.

As mentioned above, in certain described embodiments, the digital document review system 106 generates and updates a multifurcated digital repository to contain multiple renditions of a digital design document utilizing different resolutions. FIG. 4 illustrates an example flow of updating a multifurcated digital repository in accordance with one or more embodiments.

As illustrated in FIG. 4, the digital document review system 106 performs the act 410 to open a digital design document. Further, the digital document review system 106 performs the act 420 to generate a multifurcated digital repository from the current version of the digital design document. Similar to the discussion above, the act 420 includes generating, in the first portion of the multifurcated digital repository, a low-resolution rendition of the current version of the digital design document by mapping the current version of the digital design document to a predefined resolution in the first portion of the multifurcated digital repository.

For example, the digital document review system 106 can generate a multifurcated digital repository based on a manifest json that is generic and not tied to a specific format type of applications that utilize the multifurcated digital repository. For instance, in one or more implementations the multifurcated digital repository is a DCX composite tied together via a manifest file. It is document independent and can be used for any legacy document format. Manifest json for zero document is generic and need not be specific to a particular format type specific to the application. This is beneficial so that generic asset viewer web apps can consume this manifest for all dcx doc types and render the artifact from a rendition present in the zero document until full document details are available.

In this way the digital document review system 106 can utilize the manifest json for a variety of document types when providing the rendition in the multifurcated digital repository (e.g., the low-resolution rendition and the high-resolution rendition). An example of a manifest json is as follows:

```
{
    "name": "Zero Doc",
    "type": "application/vnd.adobe.html+dcx",
    "typeVersion": 1,
    "id": "d542ef17-d1cb-4950-8da6-2d4633a0ab97",
    "created": "2013-05-03T03:52:33.000Z",
    "modified": "2013-05-03T04:57:31.000Z",
    "tags": [
        "dog",
        "animal"
    ],
    "manifest-format-version": 3,
    "state": "unmodified",
    "components": [
        {
            "id": "15184755-0faf-4456-b759-c549ca496412",
            "rel": "rendition",
            "name": "fullsize",
            "type": "image/png",
            "path": "renditions/image-4096-3072.png",
```

-continued

```
    "width": 512,
    "height": 512
  },
  {
    "...": "more"
  }
],
"children": [
  {
    "...": "Structures"
  }
]
}
```

As further shown in FIG. 4, the digital document review system 106 performs act 430 to determine whether or not to update the multifurcated digital repository (e.g., update either the first, low-resolution portion and/or the second, high-resolution portion). In particular, if the digital document review system 106 determines to update the multifurcated digital repository, the digital document review system 106 performs act 440 to update the multifurcated digital repository. In one or more embodiments, the digital document review system 106 can perform the act 430 by continually monitoring the status of the digital design document to determine whether or not to update the multifurcated digital repository.

To illustrate, the digital document review system 106 can update the low-resolution rendition contained within the multifurcated digital repository. For example, if the client device saves a new version of the digital design document, the digital document review system 106 can perform act 440 to update the low-resolution rendition within the multifurcated digital repository. For example, if the client device makes a modification to the digital design document, the digital document review system 106 can perform act 440 to update the low-resolution rendition within the multifurcated digital repository. For example, at configurable time intervals, the digital document review system 106 can perform act 440 to update the low-resolution rendition of the digital design document within the multifurcated digital repository. For example, if the client device requests a digital link to the multifurcated digital repository, the digital document review system 106 can perform act 440 to update the low-resolution rendition of the digital design document within the multifurcated digital repository. For example, if the client device requests an update to the multifurcated digital repository, the digital document review system 106 can perform act 440 to update the low-resolution rendition of the digital design document within the multifurcated digital repository.

Moreover, the digital document review system 106 can update the high-resolution rendition contained within the multifurcated digital repository. For example, if the client device requests a digital link to the multifurcated digital repository, the digital document review system 106 can perform act 440 to update the high-resolution rendition of the digital design document within the multifurcated digital repository. For example, if the client device requests an updated version of the digital design document utilizing the same digital link, the digital document review system 106 can perform act 440 to update the high-resolution rendition of the digital design document within the multifurcated digital repository.

Additionally, the digital document review system 106 can perform act 450 to detect the close of the digital design document. For example, based detecting a user input or interaction the system can detect the close of a digital design document.

As further shown, the digital document review system 106 can perform the act 460 to delete the multifurcated digital repository. For example, if the digital document review system 106 detects that the client device did not utilize the multifurcated digital repository, through the use of a digital link or other method, the digital document review system 106 can delete the multifurcated digital repository. Moreover, if the digital document review system 106 detects that the client device will not utilize the multifurcated digital repository further (e.g., the client device indicates the user is finished utilizing the multifurcated digital repository), the digital document review system 106 can delete the multifurcated digital repository. Furthermore, the digital document review system 106 can delete the multifurcated digital repository based on a specified time interval.

Furthermore, in one or more implementations, if the digital document review system 106 determines that the client device requests a restriction on the digital link when closing the digital design document, the digital document review system 106 can deactivate the digital link for one or more client devices while retaining the multifurcated digital repository. Upon the client device requesting to remove the restriction on the digital link, the digital document review system 106 can reactivate the digital link for the one or more client devices.

Figure 5:
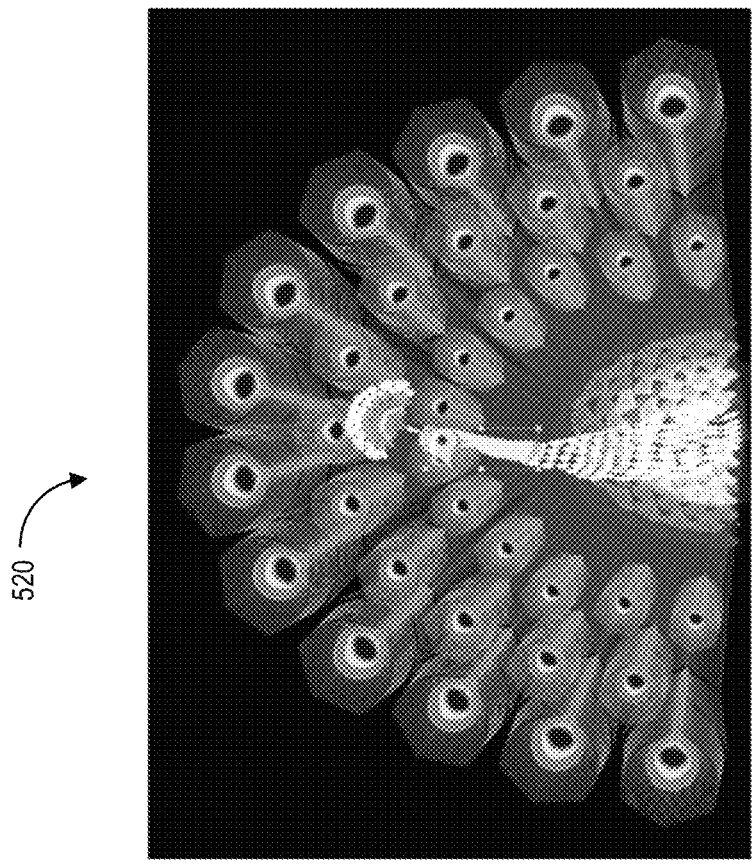
FIG. 5 illustrates an example of a modification to a digital design document in accordance with one or more embodiments.
Figure 5:
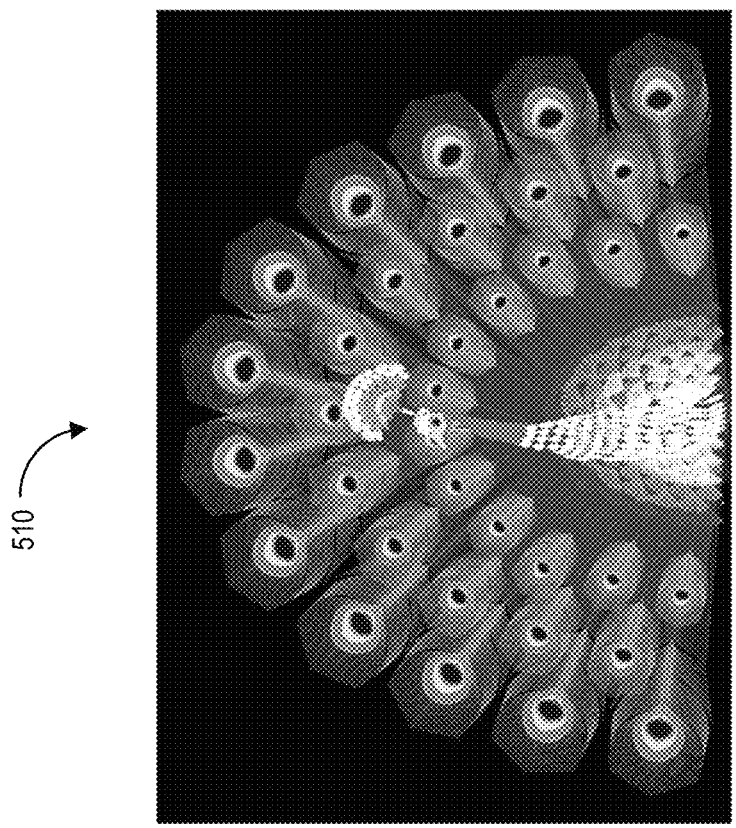

As mentioned, the digital document review system 106 can provide additional client device access to copies of current versions, or moment in time renditions, of digital design documents. FIG. 5 illustrates an example of a modification to a digital design document in accordance with one or more embodiments. As shown in FIG. 5, the digital document review system 106 can access a digital design document 510 on a client device. Based on a user modification of the digital design document 510, the digital document review system 106 can modify the digital document as shown by the modified digital design document 520 (e.g., by changing the color of the peacock's neck). As mentioned, the digital document review system 106 can create and provide a digital link to a digital copy of the modified digital design document 520. The user of the client device can then share the digital link with other client devices.

Figure 6A:
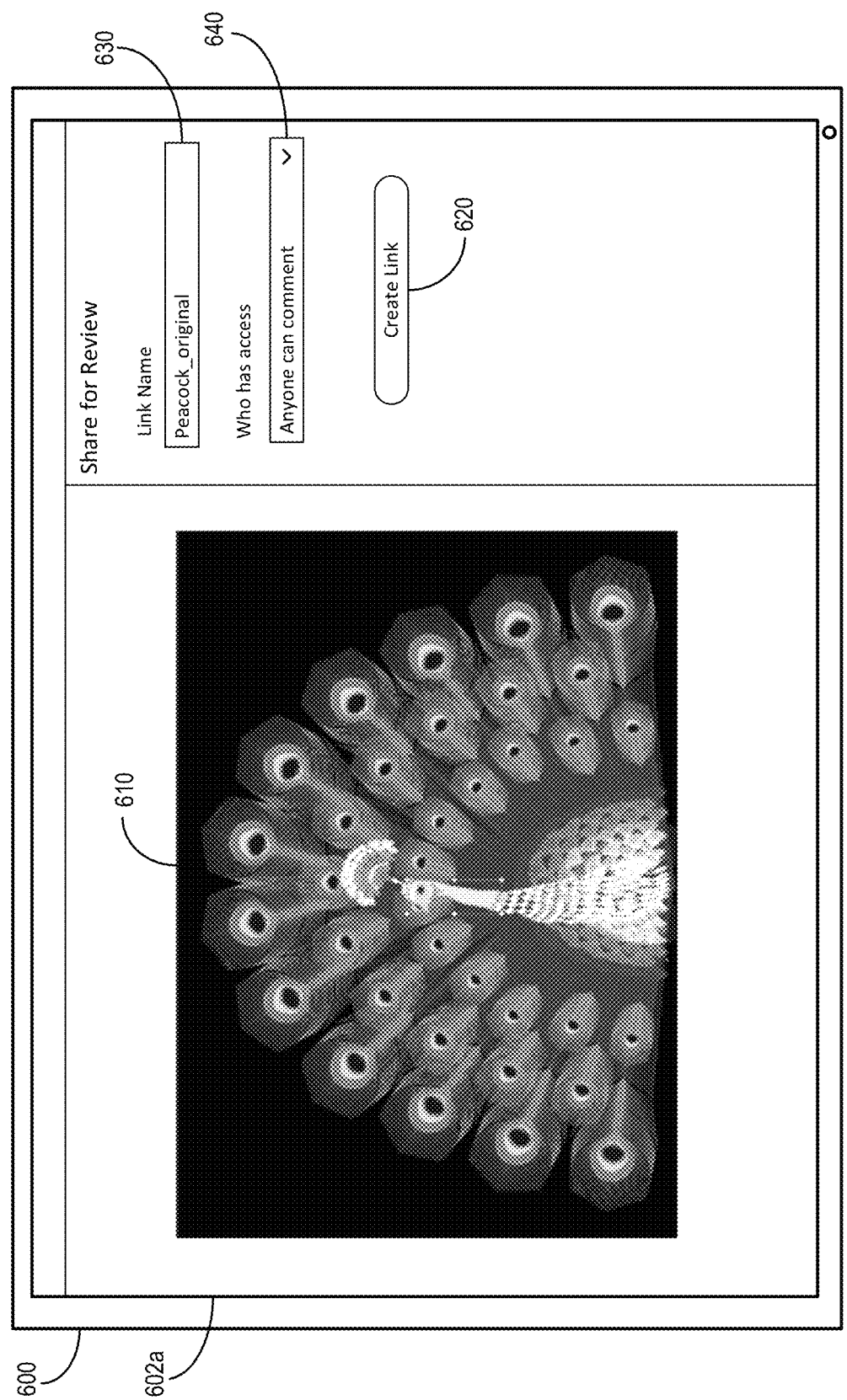
FIGS. 6A-6B illustrate example graphical user interfaces on a first client device for creating a digital link to a current rendition of a digital design document in accordance with one or more embodiments.
Figure 6B:
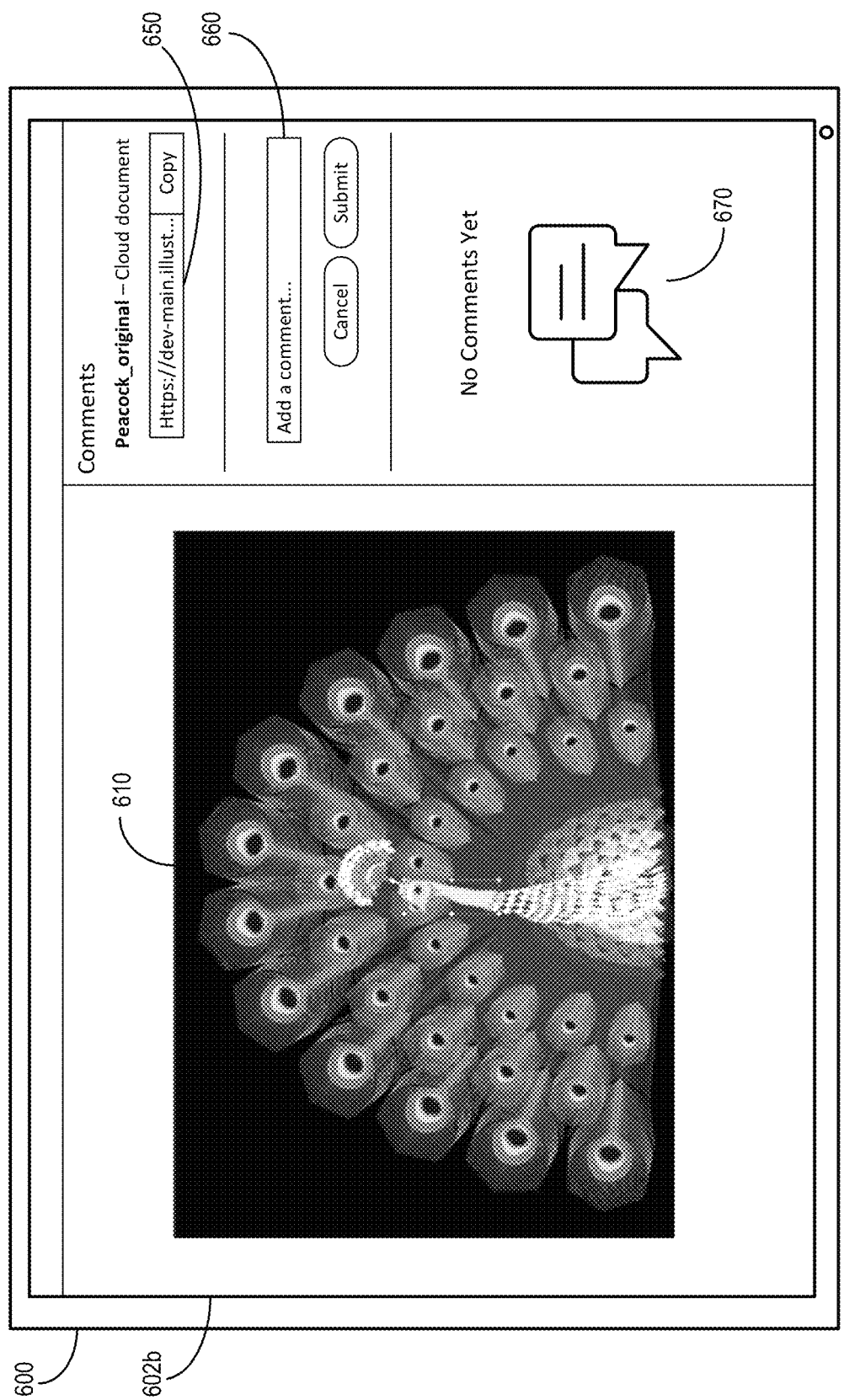

As mentioned, the digital document review system 106 provides a streamlined method to share current versions of digital design document for review on additional client devices. FIGS. 6A-6B illustrate example graphical user interfaces creating a digital link to a current rendition of a digital design document from a first client device in accordance with one or more embodiments.

FIG. 6A illustrates the digital document review system 106 providing a graphical user interface 602a on a client device 600 with a user selectable option to create a link to the current rendition of a digital design document. As shown, the digital document review system 106 provides a "create link" selectable element 620. The user of the client device 600 can select the selectable element 620 to create a shareable digital link to share the current rendition of the digital design document 610. As further shown, the digital document review system 106 can provide additional features such as the ability to add additional context to the digital link such as a link name 630. Moreover, the digital document review system 106 can provide additional features to control the functionality of the digital link such as commenting permissions 640, editing permissions, link availability constraints, or other access features.

As further shown in FIG. 6B, the digital document review system 106 can generate and provide via the graphical user interface 602b a shareable digital link to the current rendition of a digital design document 610 based on a user interaction with the selectable element 620. As mentioned, the digital document review system 106 unobtrusively maintains and updates a multifurcated digital repository with a low-resolution rendition of the digital design document transparently in the background without interaction from the user of the client device. Therefore, when the user interacts with the selectable element 620, the digital document review system 106 instantly (or quickly) generates a digital link to an existing multifurcated digital repository. In particular, the digital document review system 106 can generate the digital link 650 and provide the digital link 650 to the client device 600 to share with additional client devices.

Furthermore, the digital document review system 106 can provide additional features to allow the user of the client device 600 to interact with additional client devices. For example, the digital document review system 106 provides an interactive element 660 to add comments about the shared rendition of the digital design document. Moreover, the digital document review system 106 provides a listing 670 of the available comments from client devices (e.g., the client device 600 and additional client devices) regarding the shared rendition of the digital design document.

Figure 7A:
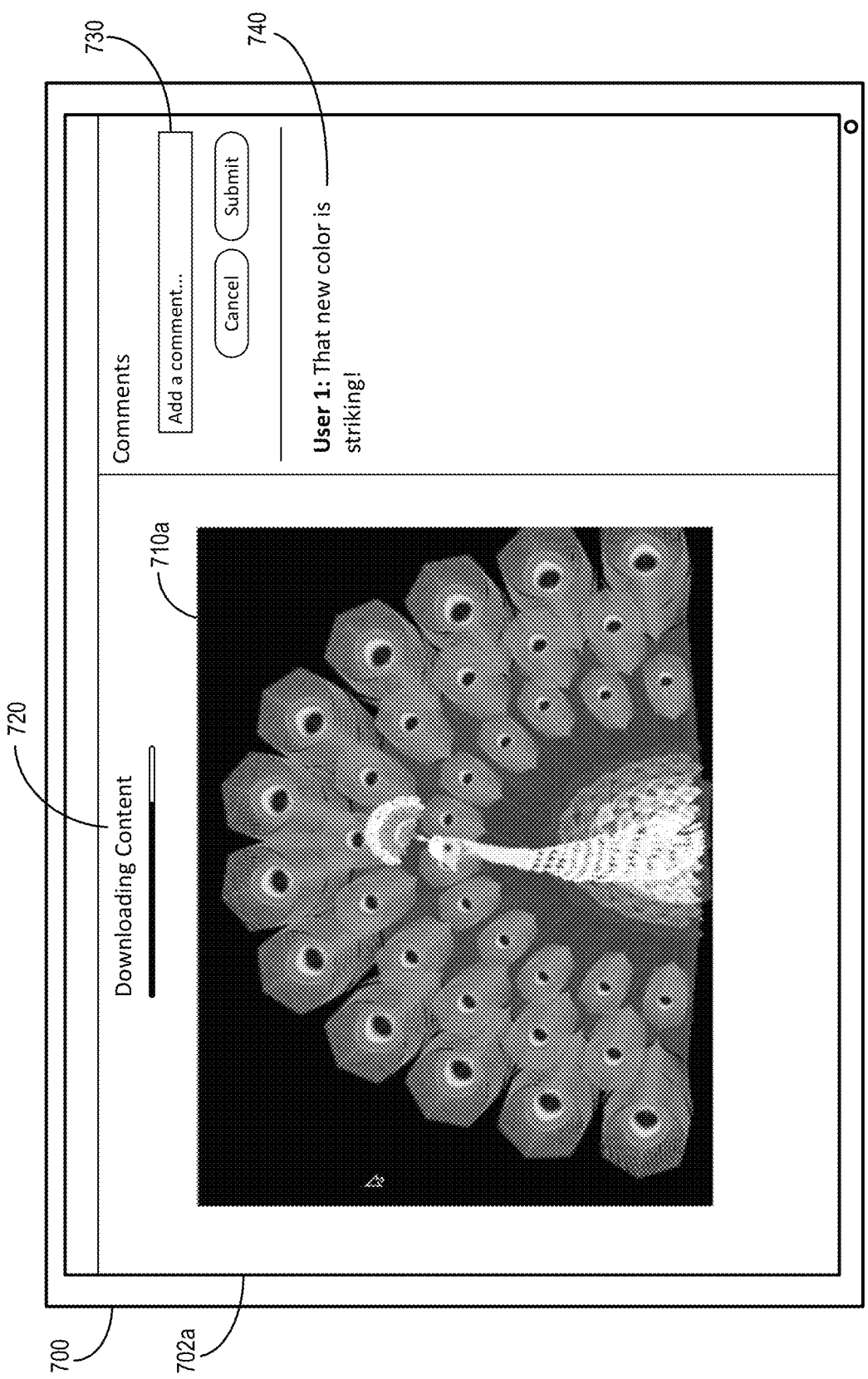
FIGS. 7A-7B illustrate example graphical user interfaces on an additional client device displaying a current rendition of a digital design document for review in accordance with one or more embodiments.
Figure 7B:
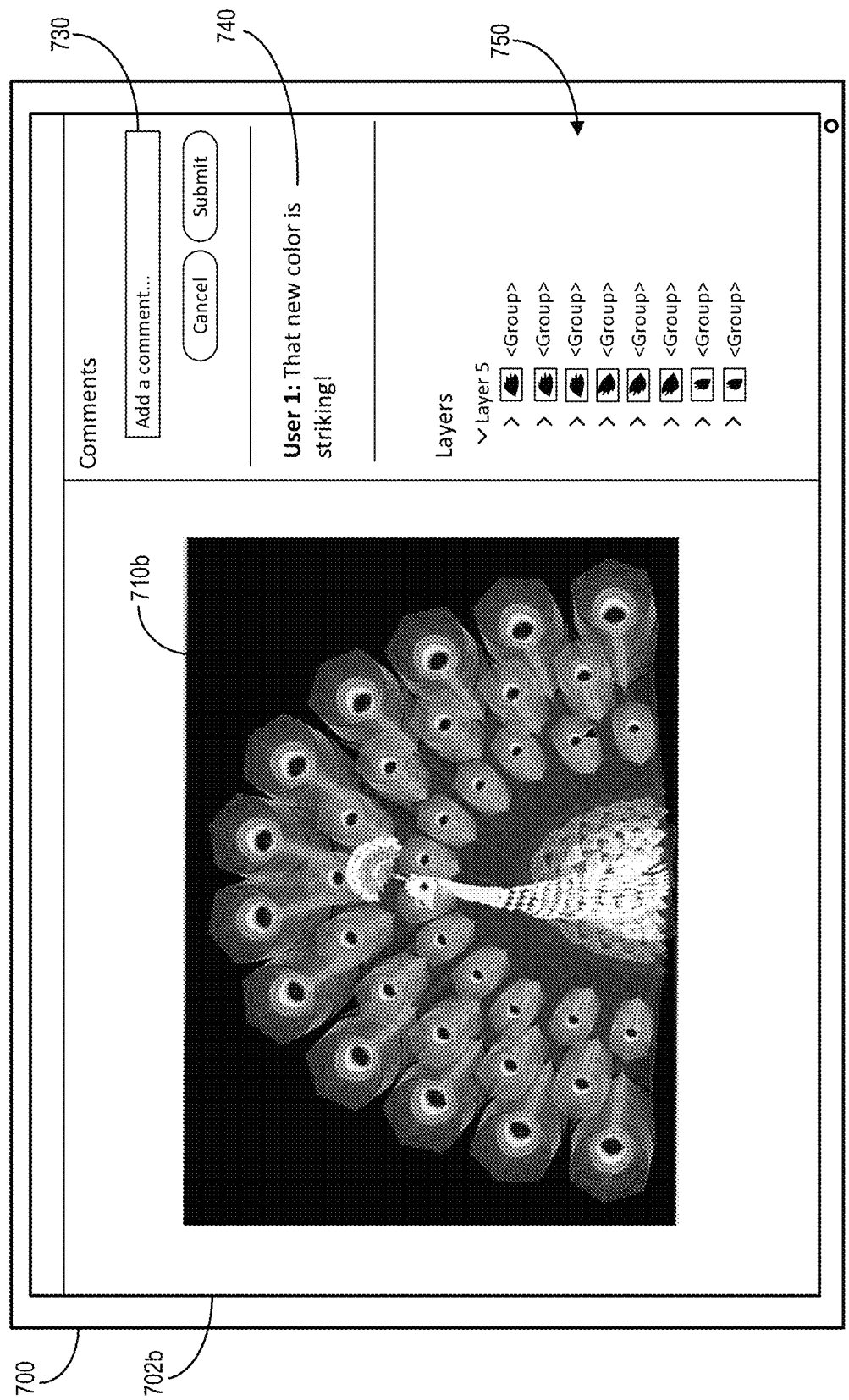

As mentioned, the digital document review system 106 provides a streamlined method to share current versions of digital design document for review on additional client devices. FIGS. 7A-7B illustrate example graphical user interfaces displaying a current rendition of a digital design document for review on an additional client device 700 in accordance with one or more embodiments.

FIG. 7A illustrates the graphical user interface 702a of the digital document review system 106 on the additional client device 700. In particular, as shown the digital document review system 106 provides, for display on the additional client device 700 the multifurcated digital repository 710a within a user application (e.g., Assets Web, Illustrator Web, Photoshop Web). As shown, the additional client device 700 displays the low-resolution rendition of the digital design document contained in the multifurcated digital repository 710a until the high-resolution rendition of the digital design document has been updated within the multifurcated digital repository. Additionally, the digital document review system 106 can display the low-resolution rendition of the digital design document on the additional client device 700 as a placeholder even if the high-resolution rendition is available within the multifurcated digital repository. To illustrate, in response to a request from the additional client device 700, the digital document review system 106 can quickly display the low-resolution rendition of the digital design document while the digital document review system 106 transmits/loads the full-resolution rendition. In this way, the additional client device can quickly access a useable version of the digital design document to begin reviewing while the multifurcated digital repository is loaded.

As further shown, the digital document review system 106 can display a status indicator 720 showing a progress towards the display of the full-resolution rendition of the digital design document. For example, the digital document review system 106 can show a status indicator 720 that indicates a percentage of the multifurcated digital repository that has been loaded and/or is viewable by the additional client device 700. In one or more embodiments, the digital document review system 106 can show a status indicator 720 that displays an estimated time for loading or viewing the full-resolution rendition of the digital design document.

The digital document review system 106 also provides a comment entry 730 within the graphical user interface 702a for the user of the additional client device 700 to provide comments/review about the current rendition of the digital design document. As shown, the digital document review system 106 also displays a comment section 740 on the additional client device 700 that displays user comments/review about the current rendition of the digital design document. Notably, because the additional client device 700 quickly displays a low-resolution rendition of the digital design document and users can begin commenting immediately upon accessing the digital design document through the digital link (and before the high-resolution rendition is available).

As further shown on FIG. 7B, the digital document review system 106 can provide the full-resolution rendition for display on the graphical user interface 702b on the additional client device 700. For example, the digital document review system 106 can provide a full-resolution rendition 710b of the digital design document within the multifurcated digital repository for display on the additional client device 700 based on detecting the multifurcated digital repository has been updated within the multifurcated digital repository. For example, the digital document review system 106 can replace the low-resolution rendition of the multifurcated digital repository 710a to provide a full-resolution rendition 710b, full fidelity version, of the digital design document within the multifurcated digital repository for display on the additional client device 700 based on an indication from the system that the upload is complete.

In addition, when the digital document review system 106 renders the full fidelity document as the full-resolution rendition 710b, the digital document review system 106 can include additional application features such as layers 750, support for zooming workflows, and application editing capability (as available in the original digital design document). In this way, the digital document review system 106 provides a method for the users of the additional client device 700 can actively review and comment on the moment-in-time version of the digital design document.

Figure 8:
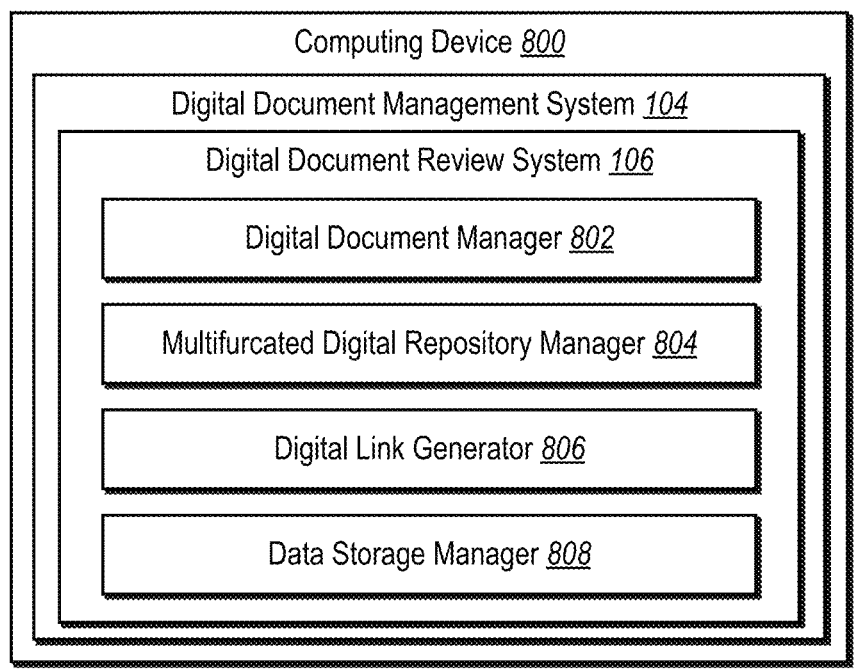
FIG. 8 illustrates a schematic diagram of a digital document review system in accordance with one or more embodiments.

Turning now to FIG. 8, additional detail will now be provided regarding various components and capabilities of the digital document review system 106. In particular, FIG. 8 illustrates the digital document review system 106 implemented by the computing device 800 (e.g., the server device(s) 102 and/or one of the client devices 110a-110n discussed above with reference to FIG. 1). Additionally, the digital document review system 106 is also part of the digital document management system 104. As shown in FIG. 8, the digital document review system 106 includes, but is not limited to, a digital document manager 802, a multifurcated digital repository manager 804, a digital link generator 806, and a data storage manager 808.

As just mentioned, and as illustrated in FIG. 8, the digital document review system 106 includes the digital document manager 802. In one or more embodiments, the digital document manager 802 retrieves or creates a selected digital design document. As mentioned above, the digital document manager 802 can manage digital design documents including digital image documents that incorporate raster and/or vector content. Furthermore, the digital document manager 802 can monitor and identify changes to content within the digital design documents. For example, the digital document manager 802 can monitor and identify a user-initiated modifications of the image content within the digital design document.

Additionally, as shown in FIG. 8, the digital document review system 106 includes the multifurcated digital repository manager 804. The multifurcated digital repository manager 804 utilizes multifurcated to provide instant access to moment-in-time renditions of digital design document to provide a streamlined size agnostic link generation system for reviewing digital documents. As mentioned above, the multifurcated digital repository manager 804 can access, create, modify and/or delete a multifurcated digital repository. In particular, the multifurcated digital repository manager 804 can update the multifurcated digital repository to contain a low-resolution rendition of the updated digital design document in the first portion of the multifurcated digital repository. Furthermore, the multifurcated digital repository manager 804 can update the second portion of the multifurcated digital repository to contain a high-resolution rendition of the updated digital design document in the second portion of the multifurcated digital repository.

As further shown in FIG. 8, the digital document review system 106 includes the digital link generator 806. In particular, the digital document review system 106 generates links to multifurcated digital repositories. In particular, the digital link generator 806 generates a link to a multifurcated digital repository containing renditions of a digital design document based on a request from a client device.

Additionally, as shown, the digital document review system 106 includes data storage manager 808. In particular, data storage manager 808 (implemented by one or more memory devices) stores the digital design documents and multifurcated digital repository. The data storage manager 808 facilitates the use of the digital design documents and multifurcated digital repositories by the digital document review system 106.

Each of the components 802-808 of the digital document review system 106 can include software, hardware, or both. For example, the components 802-808 can include one or more instructions stored on a computer-readable storage medium and executable by processors of one or more computing devices, such as a client device or server device. When executed by the one or more processors, the computer-executable instructions of the digital document review system 106 can cause the computing device(s) to perform the methods described herein. Alternatively, the components 802-808 can include hardware, such as a special-purpose processing device to perform a certain function or group of functions. Alternatively, the components 802-808 of the digital document review system 106 can include a combination of computer-executable instructions and hardware.

Furthermore, the components 802-808 of the digital document review system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 802-808 of the digital document review system 106 may be implemented as a stand-alone application, such as a desktop or mobile application. Furthermore, the components 802-808 of the digital document review system 106 may be implemented as one or more web-based applications hosted on a remote server. Alternatively, or additionally, the components 802-808 of the digital document review system 106 may be implemented in a suite of mobile device applications or "apps." For example, in one or more embodiments, the digital document review system 106 can comprise or operate in connection with digital software applications such as: ADOBE® PHOTOSHOP, ADOBE® ILLUSTRATOR, ADOBE® LIGHTROOM, ADOBE® INDESIGN, ADOBE® XD, ADOBE® PREMIERE PRO, ADOBE® AFTER EFFECTS, or ADOBE® DIMENSION, ADOBE® ACROBAT PRO DC. The foregoing are either registered trademarks or trademarks of Adobe Inc. in the United States and/or other countries.

FIGS. 1-8, the corresponding text, and the examples provide a number of different methods, systems, devices, and non-transitory computer-readable media of the digital document review system 106. In addition to the foregoing, one or more embodiments can also be described in terms of flowcharts comprising acts for accomplishing a particular result, as shown in FIG. 9. The acts shown in FIG. 9 may be performed in connection with more or fewer acts. Further, the acts may be performed in differing orders. Additionally, the acts described herein may be repeated or performed in parallel with one another or parallel with different instances of the same or similar acts. A non-transitory computer-readable medium can comprise instructions that, when executed by one or more processors, cause a computing device to perform the acts of FIG. 9. In some embodiments, a system can be configured to perform the acts of FIG. 9. Alternatively, the acts of FIG. 9 can be performed as part of a computer-implemented method.

Figure 9:
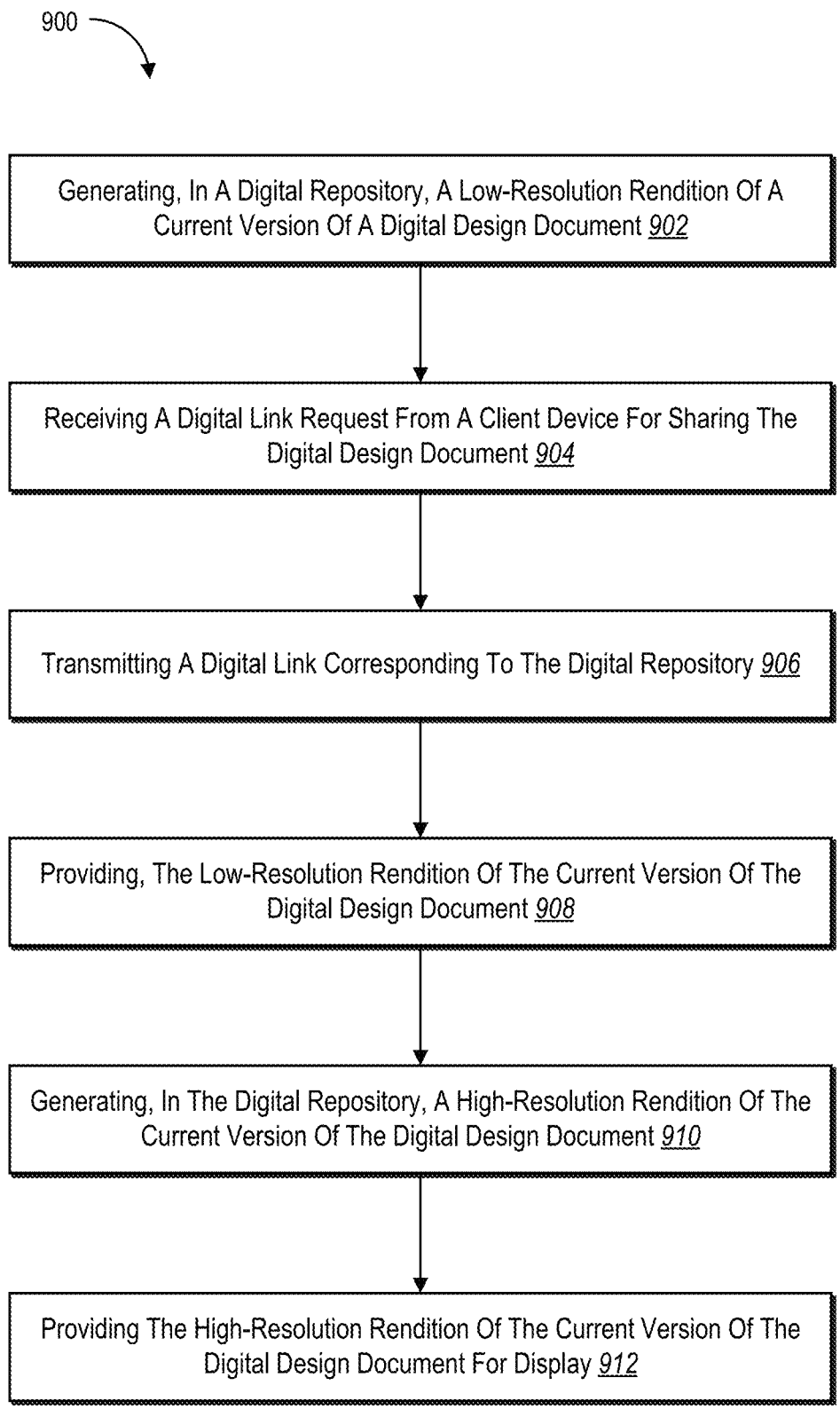
FIG. 9 illustrates a flowchart of a series of acts for generating and providing a multifurcated digital repository in accordance with one or more embodiments.

FIG. 9 illustrates a flowchart of a series of acts 900 for modifying a digital document with a digital document review system 106 in accordance with one or more embodiments. While FIG. 9 illustrates acts according to one embodiment, alternative embodiments may omit, add to, reorder, and/or modify any acts shown in FIG. 9.

FIG. 9 illustrates an example series of acts 900 for utilizing a digital document review system 106 to review a digital design document. In particular, the series of acts 900 includes an act 902 of generating, in a digital repository, a low-resolution rendition of a current version of the digital design document. Specifically, the act 902 can include generating, in a digital repository, a low-resolution rendition of a current version of a digital design document. As illustrated, the series of acts 900 can also include an act 904 of receiving a digital link request from a client device for sharing a digital design document. In particular, the act 904 can include receiving a digital link request from a client device for sharing a digital design document with an additional client device.

Moreover, as shown in FIG. 9, the series of acts 900 can include the act 906 of transmitting a digital link corresponding to the digital repository. In particular, the act 906 can include, in response to receiving the digital link request, transmitting a digital link corresponding to the digital repository of the client device. Further, the series of acts 900 can also include an act 908 of providing, the low-resolution rendition of the current version of the digital design document. In particular, the act 908 can include, in response to the additional client device obtaining the digital link from the client device, providing the low-resolution rendition of the current version of the digital design document associated with the digital link for display on the additional client device.

Furthermore, as shown in FIG. 9, the series of acts 900 can include the act 910 of generating, in the digital repository, a high-resolution rendition of the current version of the digital design document. Further, the series of acts 900 can also include an act 912 of providing the high-resolution rendition of the current version of the digital design document for display. In particular, the act 912 can include providing the high-resolution rendition of the current version of the digital design document for display on the additional client device.

In addition (or in the alternative) to the acts described above, the digital document review system series of acts 900 can include, based on the additional client device utilizing the digital link, providing, for display on the additional client device, the low-resolution rendition of the current version of the digital design document or high-resolution rendition of the current version of the digital design document based on detecting whether the digital repository includes the high-resolution rendition of the current version of the digital design document. Moreover, in one or more embodiments, the digital document review system 106 series of acts 900 includes replacing the low-resolution rendition of the current version of the digital design document with the high-resolution rendition of the current version of the digital design document from a second portion of the digital repository.

Further still, in some embodiments, the digital document review system 106 series of acts 900 includes mapping the current version of the digital design document to a predefined resolution in a first portion of the digital repository, wherein the predefined resolution is lower than an initial resolution of the current version of the digital design document. Moreover, in one or more embodiments, the digital document review system series of acts 900 includes mapping the current version of the digital design document to a second portion of the digital repository at the initial resolution.

Furthermore, one or more embodiments, the series of acts 900 includes receiving a new version of the digital design document corresponding to a client device; and generating, in a first portion of the digital repository, a low-resolution rendition of the new version of the digital design document. Further still, in one or more embodiments, the series of acts 900 includes updating the digital repository to include a high-resolution rendition of the new version of the digital design document in a second portion of the digital repository. Moreover, in one or more embodiments, the series of acts 900 includes deleting the digital repository in response to detecting the client device closing the digital design document.

Moreover, one or more embodiments, the series of acts 900 includes generating, in a first portion of a multifurcated digital repository, a low-resolution rendition of a current version of a digital design document corresponding to a client device. generating a digital link corresponding to the multifurcated digital repository for sharing with an additional client device. Further still, in one or more embodiments, the series of acts 900 includes modifying the multifurcated digital repository to include a high-resolution rendition of the current version of the digital design document in a second portion of the multifurcated digital repository. In addition, in one or more embodiments, the series of acts 900 includes providing the digital link corresponding to the multifurcated digital repository for displaying the digital design document on the additional client device.

Furthermore, in one or more embodiments, the series of acts 900 includes updating the multifurcated digital repository to include the high-resolution rendition of the current version of the digital design document in the second portion of the multifurcated digital repository in response to receiving a link request from the client device for sharing the digital design document with the additional client device. Moreover, in one or more embodiments, the series of acts 900 includes detecting the client device closing the digital design document; and deleting the multifurcated digital repository.

Further still, in one or more embodiments, the series of acts 900 includes providing the digital link corresponding to the multifurcated digital repository for displaying the digital design document on the additional client device in response to receiving a link request from the client device; and based on the additional client device utilizing the digital link, providing, for display on the additional client device, the low-resolution rendition of the current version of the digital design document. Moreover, in one or more embodiments, the series of acts 900 includes, upon detecting that the second portion of the multifurcated digital repository includes the high-resolution rendition of the current version of the digital design document, providing, for display on the additional client device, the high-resolution rendition of the current version of the digital design document.

In addition, in one or more embodiments, the series of acts 900 includes generating, in the first portion of the multifurcated digital repository, the low-resolution rendition of the current version of the digital design document comprises mapping the current version of the digital design document to a predefined resolution in the first portion of the multifurcated digital repository, wherein the predefined resolution is lower than an initial resolution of the current version of the digital design document. Moreover, in one or more embodiments, the series of acts 900 includes updating the multifurcated digital repository to include the high-resolution rendition of the current version of the digital design document in the second portion of the multifurcated digital repository comprises mapping the current version of the digital design document to the second portion of the multifurcated digital repository at the initial resolution.

Furthermore, in one or more embodiments, the series of acts 900 includes receiving a new version of the digital design document corresponding to a client device; generating, in the first portion of the multifurcated digital repository, a low-resolution rendition of the new version of the digital design document; and updating the multifurcated digital repository to include a high-resolution rendition of the new version of the digital design document in the second portion of the multifurcated digital repository. Moreover, in one or more embodiments, the series of acts 900 includes, based on an update to the current version of the digital design document corresponding to the client device, updating the low-resolution rendition of the current version of the digital design document corresponding to the client device. Further, in one or more embodiments, the series of acts 900 includes generating the low-resolution rendition of the current version of the digital design document in response to receiving the digital link request from the client device for sharing the digital design document with the additional client device.

Moreover, in one or more embodiments, the series of acts 900 includes, based on an update to the current version of the digital design document corresponding to the client device, updating the low-resolution rendition of the current version of the digital design document corresponding to the client device. In one or more embodiments, the series of acts 900 includes generating the low-resolution rendition of the current version of the digital design document in response to receiving the link request from the client device for sharing the digital design document with the additional client device. Furthermore, in one or more embodiments, the series of acts 900 includes generating, in the first portion of the multifurcated digital repository, the low-resolution rendition of the current version of the digital design document comprises mapping the current version of the digital design document to a predefined resolution in the first portion of the multifurcated digital repository.

In addition, in one or more embodiments, the series of acts 900 includes, based on the additional client device utilizing the digital link, providing, for display on the additional client device, the low-resolution rendition of the current version of the digital design document. Furthermore, in one or more embodiments, the series of acts 900 includes, upon detecting that the second portion of the multifurcated digital repository includes the high-resolution rendition of the current version of the digital design document, providing, for display on the additional client device, the high-resolution rendition of the current version of the digital design document by replacing the low-resolution rendition of the current version of the digital design document from the first portion of multifurcated digital repository with the high-resolution rendition of the current version of the digital design document from the second portion of the multifurcated digital repository.

Furthermore, in one or more embodiments, the series of acts 900 includes generating, in a first portion of a multifurcated digital document, a low-resolution rendition of a current version of a digital design document corresponding to a user device; in response to receiving a link request from the user device for sharing the digital design document with an additional user device, providing, to the user device, a digital link to access the multifurcated digital document; updating the multifurcated digital document to include a high-resolution rendition of the current version of the digital design document in a second portion of the multifurcated digital document; and based on the additional user device utilizing the digital link, providing, for display on the additional user device, the multifurcated digital document.

Moreover, in one or more embodiments, the series of acts 900 includes generating, in a first portion of a multifurcated digital document, a low-resolution rendition of a current version of a digital design document corresponding to a client device; in response to receiving a link request from the client device for sharing the digital design document with an additional client device, providing, to the client device, a digital link to access the multifurcated digital document; updating the multifurcated digital document to include a high-resolution rendition of the current version of the digital design document in a second portion of the multifurcated digital document; and based on the additional client device utilizing the digital link, providing, for display on the additional client device, the multifurcated digital document.

Furthermore, in one or more embodiments, the series of acts 900 includes generating, in a first portion of a multifurcated digital document, a low-resolution rendition of a current version of a digital design document corresponding to a client device; providing, for display via a collaborative web interface of an additional client device, the low-resolution rendition from the multifurcated digital document; updating the multifurcated digital document to include a high-resolution rendition of the current version of the digital design document in a second portion of the multifurcated digital document; and upon updating the multifurcated digital document, providing, for display via the collaborative web interface of the additional client device, the high-resolution rendition of the current version of the digital design document from the second portion of the multifurcated digital document.

In addition, in one or more embodiments, the series of acts 900 includes generating, in a first portion of a multifurcated digital repository, a low-resolution rendition of a current version of a digital design document corresponding to a client device; in response to receiving a link request from the client device for sharing the digital design document with an additional client device, providing, to the client device, a digital link to access the multifurcated digital repository; updating the multifurcated digital repository to include a high-resolution rendition of the current version of the digital design document in a second portion of the multifurcated digital repository; and based on the additional client device utilizing the digital link, providing, for display to the additional client device, the multifurcated digital repository.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 10:
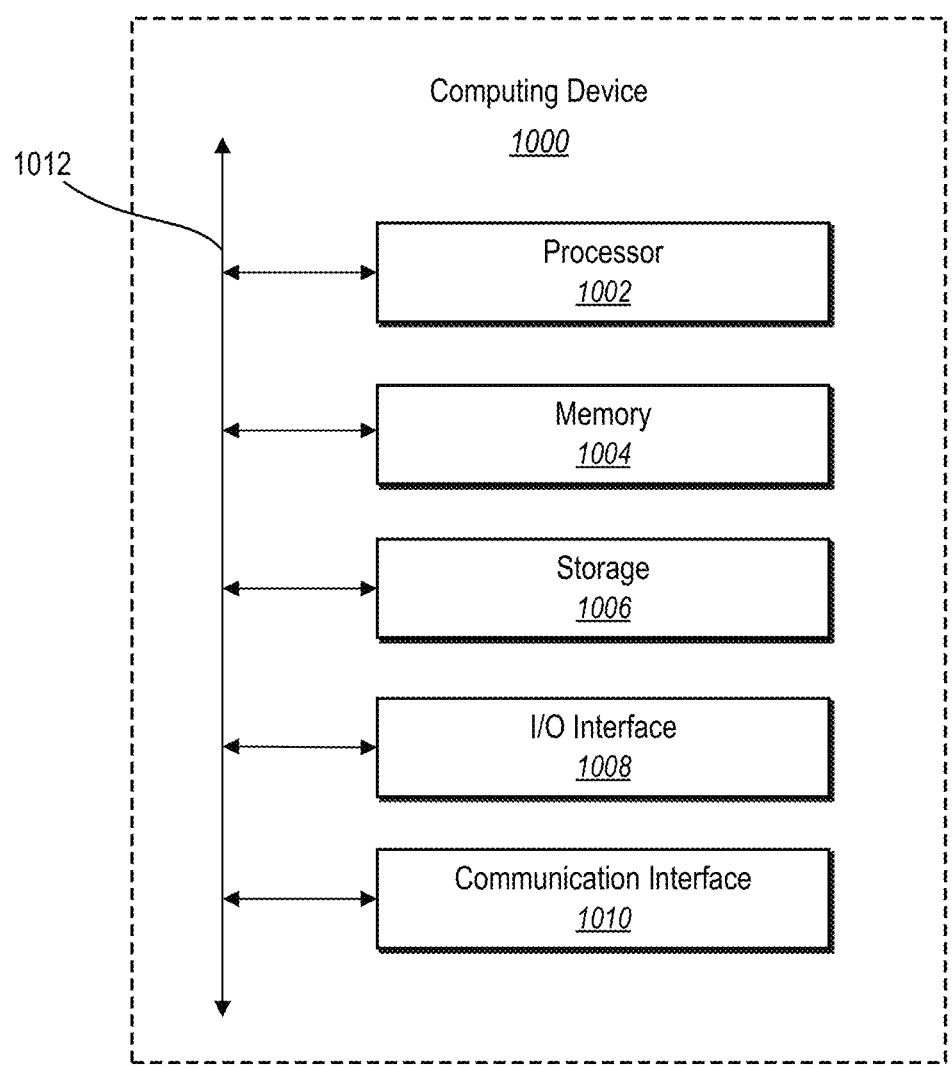
FIG. 10 illustrates a block diagram of an example computing device in accordance with one or more embodiments.

FIG. 10 illustrates a block diagram of an example computing device 1000 that may be configured to perform one or more of the processes described above. One will appreciate that one or more computing devices, such as the computing device 1000 may represent the computing devices described above (e.g., server device(s) 102, client devices 110a-110n, and computing device 1000). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
    generating, in a first portion of a multifurcated digital repository, a low-resolution rendition of a current version of a digital design document;
    receiving a digital link request from a client device for sharing a digital design document with an additional client device;
    in response to receiving the digital link request from the client device, transmitting a digital link to the client device corresponding to the multifurcated digital repository for the digital design document; and
    in response to the additional client device obtaining the digital link from the client device:
        providing the low-resolution rendition of the current version of the digital design document in the first portion of the multifurcated digital repository associated with the digital link for display on the additional client device;
        generating, in a second portion of the multifurcated digital repository, a high-resolution rendition of the current version of the digital design document; and
        providing the high-resolution rendition of the current version of the digital design document in the second portion of the multifurcated digital repository for display on the additional client device.

2. The method of claim 1 further comprising, based on the additional client device utilizing the digital link:
    providing, for display on the additional client device, the low-resolution rendition of the current version of the digital design document or the high-resolution rendition of the current version of the digital design document based on detecting whether the multifurcated digital repository includes the high-resolution rendition of the current version of the digital design document.

3. The method of claim 1, wherein providing the high-resolution rendition of the current version of the digital design document for display on the additional client device comprises replacing the low-resolution rendition of the current version of the digital design document with the high-resolution rendition of the current version of the digital design document from the second portion of the multifurcated digital repository.

4. The method of claim 1, wherein generating, in the multifurcated digital repository, the low-resolution rendition of the current version of the digital design document comprises mapping the current version of the digital design document to a predefined resolution in a first portion of the multifurcated digital repository, wherein the predefined resolution is lower than an initial resolution of the current version of the digital design document.

5. The method of claim 4, wherein generating, in the multifurcated digital repository, the high-resolution rendition of the current version of the digital design document comprises mapping the current version of the digital design document to a second portion of the multifurcated digital repository at the initial resolution.

6. The method of claim 1, further comprising:
    receiving a new version of the digital design document corresponding to a client device; and
    updating, in the first portion of the multifurcated digital repository, the low-resolution rendition of the current version of the digital design document with a low-resolution rendition of the new version of the digital design document.

7. The method of claim 6, further comprising:
    updating the multifurcated digital repository to include a high-resolution rendition of the new version of the digital design document in the second portion of the multifurcated digital repository.

8. The method of claim 1 further comprising, deleting the multifurcated digital repository in response to detecting the client device closing the digital design document.

9. A system comprising:
    a memory component; and
    one or more processing devices coupled to the memory component, the one or more processing devices to perform operations comprising:
        generating, in a first portion of a multifurcated digital repository, a low-resolution rendition of a current version of a digital design document corresponding to a client device;
        generating a digital link corresponding to the multifurcated digital repository for sharing with an additional client device;

modifying the multifurcated digital repository to include a high-resolution rendition of the current version of the digital design document in a second portion of the multifurcated digital repository; and providing the digital link corresponding to the multifurcated digital repository for displaying the low-resolution rendition of the current version of the digital design document and the high-resolution rendition of the current version of the digital design document on the additional client device.

10. The system of claim 9, wherein the operations further comprise updating the multifurcated digital repository to include the high-resolution rendition of the current version of the digital design document in the second portion of the multifurcated digital repository in response to receiving a link request from the client device for sharing the digital design document with the additional client device.

11. The system of claim 9, wherein the operations further comprise:
 detecting the client device closing the digital design document; and
 deleting the multifurcated digital repository.

12. The system of claim 9, further comprising:
 providing the digital link corresponding to the multifurcated digital repository for displaying the digital design document on the additional client device in response to receiving a link request from the client device; and
 based on the additional client device utilizing the digital link, providing, for display on the additional client device, the low-resolution rendition of the current version of the digital design document.

13. The system of claim 12, wherein the operations further comprise upon detecting that the second portion of the multifurcated digital repository includes the high-resolution rendition of the current version of the digital design document, providing, for display on the additional client device, the high-resolution rendition of the current version of the digital design document.

14. The system of claim 9, wherein:
 generating, in the first portion of the multifurcated digital repository, the low-resolution rendition of the current version of the digital design document comprises mapping the current version of the digital design document to a predefined resolution in the first portion of the multifurcated digital repository, wherein the predefined resolution is lower than an initial resolution of the current version of the digital design document; and
 modifying the multifurcated digital repository to include the high-resolution rendition of the current version of the digital design document in the second portion of the multifurcated digital repository comprises mapping the current version of the digital design document to the second portion of the multifurcated digital repository at the initial resolution.

15. The system of claim 9, wherein the operations further comprise:
 receiving a new version of the digital design document corresponding to a client device;
 generating, in the first portion of the multifurcated digital repository, a low-resolution rendition of the new version of the digital design document; and
 updating the multifurcated digital repository to include a high-resolution rendition of the new version of the digital design document in the second portion of the multifurcated digital repository.

16. A non-transitory computer readable medium storing executable instructions which, when executed by a processing device, cause the processing device to perform operations comprising:
 generating, in a first portion of a multifurcated digital repository, a low-resolution rendition of a current version of a digital design document;
 receiving a digital link request from a client device for sharing a digital design document with an additional client device;
 in response to receiving the digital link request from the client device, transmitting a digital link to the client device corresponding to the multifurcated digital repository for the digital design document; and
 in response to the additional client device obtaining the digital link from the client device:
  providing the low-resolution rendition of the current version of the digital design document in the first portion of the multifurcated digital repository associated with the digital link for display on the additional client device;
  generating, in a second portion of the multifurcated digital repository, a high-resolution rendition of the current version of the digital design document; and
  providing the high-resolution rendition of the current version of the digital design document in the second portion of the multifurcated digital repository for display on the additional client device.

17. The non-transitory computer readable medium of claim 16, wherein the operations further comprise, based on an update to the current version of the digital design document corresponding to the client device, updating the low-resolution rendition of the current version of the digital design document corresponding to the client device.

18. The non-transitory computer readable medium of claim 16, wherein the operations further comprise, generating the low-resolution rendition of the current version of the digital design document in response to receiving the digital link request from the client device for sharing the digital design document with the additional client device.

19. The non-transitory computer readable medium of claim 16, wherein generating, in a first portion of the multifurcated digital repository, the low-resolution rendition of the current version of the digital design document comprises mapping the current version of the digital design document to a predefined resolution in the first portion of the multifurcated digital repository.

20. The non-transitory computer readable medium of claim 16, wherein the operations further comprise:
 based on the additional client device utilizing the digital link, providing, for display on the additional client device, the low-resolution rendition of the current version of the digital design document; and
 upon detecting that a second portion of the multifurcated digital repository includes the high-resolution rendition of the current version of the digital design document, providing, for display on the additional client device, the high-resolution rendition of the current version of the digital design document by replacing the low-resolution rendition of the current version of the digital design document from a first portion of multifurcated digital repository with the high-resolution rendition of the current version of the digital design document from the second portion of the multifurcated digital repository.

* * * * *